March 26, 1946. H. SCHWARTZ ET AL 2,397,160
RANGE FINDER FOR CAMERAS
Filed March 2, 1945 2 Sheets-Sheet 1
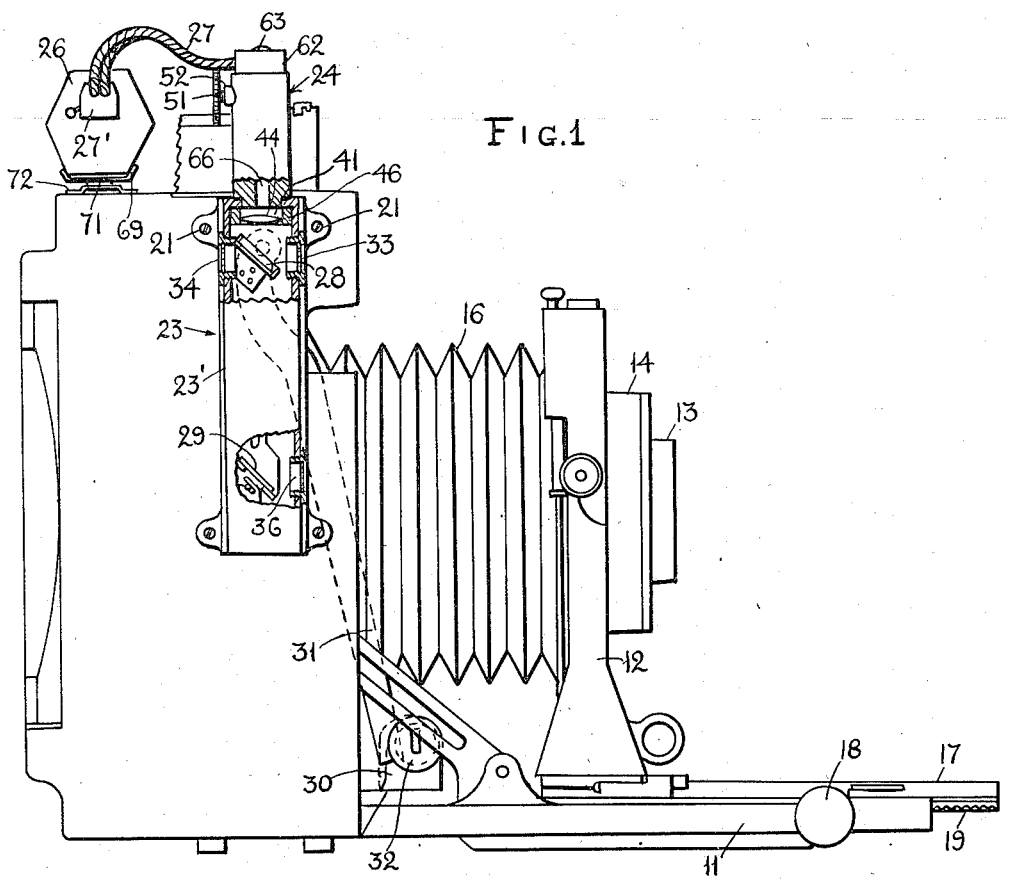
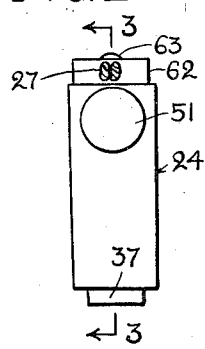
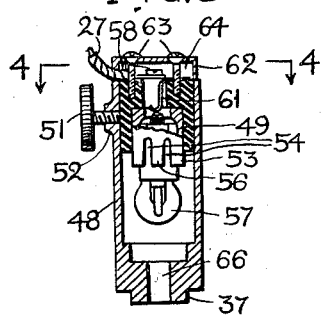
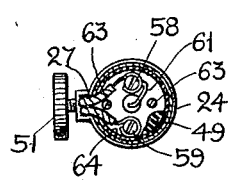
HYMAN SCHWARTZ
WILLIAM CASTEDELLO
INVENTORS.
BY
ATTORNEY

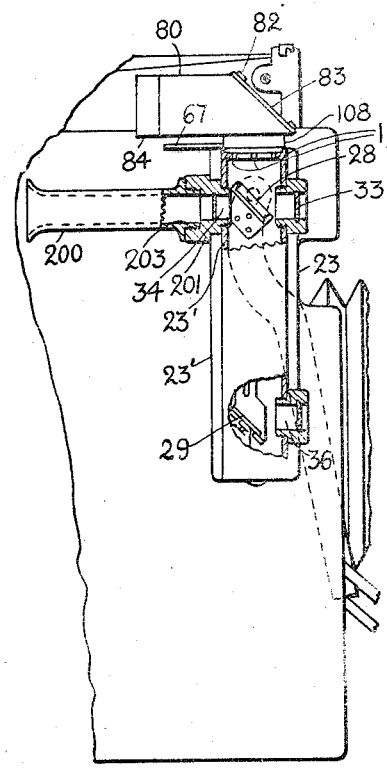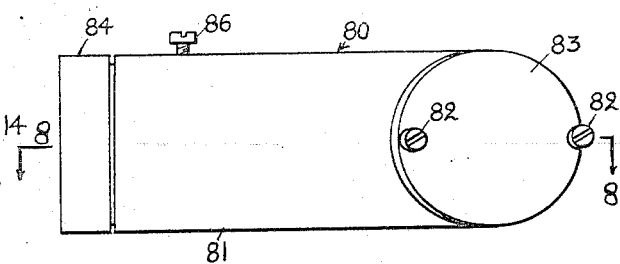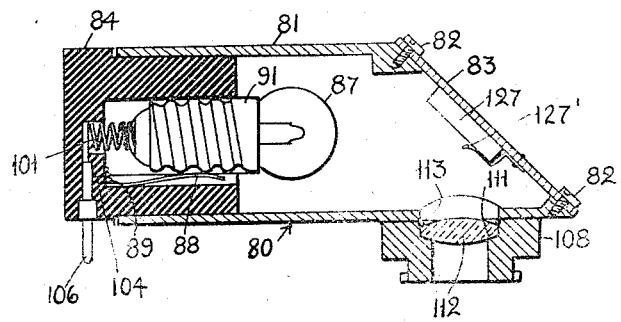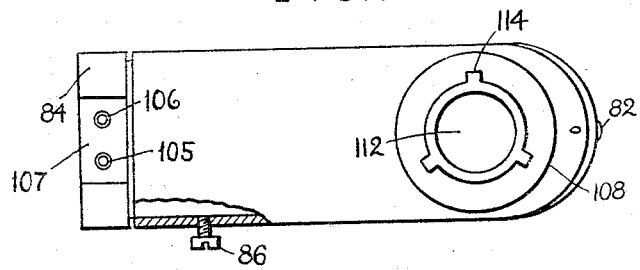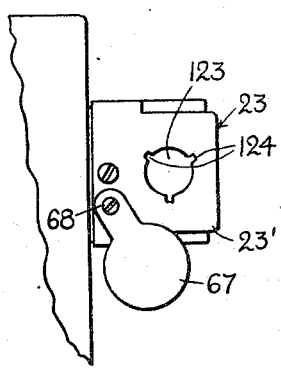

UNITED STATES PATENT OFFICE 2,397,160

RANGE FINDER FOR CAMERAS

Hyman Schwartz and William Castedello, Stamford, Conn., assignors to The Kalart Company, Inc., Stamford, Conn.

Application March 2, 1945, Serial No. 580,628

12 Claims. (Cl. 95—44)

This invention relates to rangefinders for use in conjunction with photographic apparatus such as cameras, more specifically it relates to rangefinders which can be used under any light conditions and which may be described as "rangefinders for day and night use."

The word "camera" as used herein is intended to include apparatus for the taking of photographs as well as devices such as moving picture projectors, television, cameras, enlargers, and the like, or in other words any device including a lens to be focused on an object or screen.

Rangefinders of the type described which are usually attached to the camera serve to facilitate the focusing of the camera lens. As it is well known in the art, in order to take a good picture with sharp definition it is necessary to focus the camera lens according to the distance of the object to be taken, and the rangefinder is used either to measure the range between camera and object or to focus the camera lens directly by coupling the lens movement with the adjustment of the reflector system of the rangefinder.

One of the principal objects of the invention is a rangefinder which can be used under any light conditions without requiring a rearrangement or relocation of any part or component of the rangefinder.

Another object of the invention is a rangefinder by means of which the range of the object can be measured or the camera lens be focused either by observation and relative adjustment of two images viewable on one of the reflectors of the rangefinder in case the available light is sufficiently bright for such determination of the range or by direct observation and relative adjustment of two light spots projected by the rangefinder upon the object.

Another object of the invention is to provide a means by which the reflector system of the rangefinder can be used either to produce the two images of the object when the rangefinder is employed at favorable light conditions or to project the two light spots to be compared upon the object when the rangefinder is used at subdued or dimmed light conditions.

Another object of the invention is to provide a simple and convenient means for using the rangefinder either as a "day light rangefinder" or as a "night rangefinder." It will of course be understood that the words "day" and "night" are used to indicate the light conditions rather than the time of the day.

Another object of the invention is to provide a rangefinder which in addition to assisting in proper focusing of a camera under light conditions insufficient for observation and comparison of two images visible on a reflector of the rangefinder, indicates whether the camera is properly aimed at the object to be photographer. This is accomplished by adjusting the reflector system of the rangefinder so that one of the light beams emanating from the rangefinder is substantially parallel with the axis of the camera lens.

Another of the objects of the invention is to provide a means by which a light unit employed to produce the light spots in coaction with the reflector system of the rangefinder can be conveniently and removably attached to the rangefinder casing including the reflector system of the rangefinder.

Other and further objects of the invention will be hereinafter set forth and the novel features thereof defined by the appended claims.

According to a now preferred embodiment of the invention the rangefinder comprises two mirrors, one stationary and the other pivotally mounted. One of the mirrors, preferably the stationary one is semi-transparent and the other has a fully silvered surface. The mirror system is mounted in a casing having two object windows and one observation window for viewing two images visible on one of the mirrors, preferably on the stationary mirror. A light unit such as an electric bulb is mounted on the rangefinder casing in a direct line with the centers of both mirrors so that the light unit and the mirrors share a common axis, the light unit being placed adjacent to the semi-transparent mirror. Consequently a light beam emanating from the light unit will first strike the upper side of the reflecting surface of the semi-transparent mirror and will be reflected by this surface to produce one of the light spots on the object, part of this light beam will pass or be filtered through the semi-transprent mirror and strike the second mirror which will reflect the light beam to produce the second light spot on the object. By varying the angular position of the second or movable mirror the relative position of the light spots can be changed. The movable mirror is so coupled with the lens carrier of the camera that the lens is properly focused when the two light spots are in a predetermined relative position. The lower side of the reflecting surface of the first or stationary mirror is used for rangefinding at light conditions not requiring the use of light spots. On this lower reflecting surface of the mirror the two images to be compared will be viewable.

The invention is particularly advantageous for use in conjunction with rangefinders of the so called "super-imposed image" type, but it should be understood that it is also applicable to rangefinders of the "split image" type. Furthermore, the invention is not limited to rangefinders having only a stationary and a movable reflector but may also be applied to rangefinders having a more complicated mirror system such as described in the copending application Ser. No. 515,882, filed December 28, 1943.

The present application is a continuation in part of the application Ser. No. 438,350, filed April 9, 1942.

The above and still further objects of the invention will be more apparent in the following detailed description when taken in conjunction with the accompanying drawings, in the latter of which:

Fig. 1 is a side elevational view of a camera in an open condition with a rangefinder comprising the present invention attached thereto:

Fig. 2 is a side elevational view of the light unit of the rangefinder.

Fig. 3 is a vertical sectional view taken substantially on line 3—3 of Fig. 2 through the cener of the light unit.

Fig. 4 is a horizontal sectional view taken substantially on line 4—4 of Fig. 3;

Fig. 5 is a side view of a modified rangefinder according to the invention with the light unit secured thereto, the rangefinder being shown attached to a camera;

Fig. 6 is a plane view of the rangefinder of Fig. 5, the light unit being removed;

Fig. 7 is a front view of the light unit of the rangefinder of Fig. 5 shown on an enlarged scale;

Fig. 8 is a sectional view of the light unit taken on line 8—8 of Fig. 7, and

Fig. 9 is a rear view of the light unit of Fig. 7;

Referring first to Fig. 1 there is shown the side view of a camera with the elements comprising a rangefinder according to the invention associated therewith. The camera includes a bed portion 11 which in the open condition of the camera is located as shown. Movable back and forth on the camera bed 11 is an objective lens carrier 12 which carries a lens 13 and a shutter 14. A bellows 16 is attached at one end to one side of the lens carrier while the other end is secured to the camera casing. A set of tracks and guides 17 serves to guide and move the lens carrier 12 back and forth relative to the camera casing on the camera bed 11. A knurled focusing knob 18 cooperates with a rack 19 to permit adjustment of the position of the lens carrier 12 in a manner well known in the art.

Secured to the side of the camera casing by screws such as 21 is a rangefinder according to the invention indicated in general by reference numeral 23 which may be of the type disclosed in the copending application filed November 10, 1941, Serial No. 418,516, now Patent No. 2,376,982, dated May 29, 1945, or in the copending application filed December 28, 1943, Serial No. 515,882. Secured to the upper end of the rangefinder casing 23' in a manner described in more detail hereinafter is a light unit generally designated 24 forming part of the rangefinder. The light unit is connected to a battery casing 26 removably attached to the top of the camera casing. An electric cable 27 connects the light unit with the battery casing 26.

While in the drawings the invention is shown applied to and cooperating with a camera of the type known in the art as the Speed Graphic, and a rangefinder of the type above referred to, it will be obvious that application of the invention is not limited to these particular types but may be applied to various other types, the above types being chosen merely to illustrate the principles of the invention. In general, the rangefinder 23, Fig. 1, comprises a fixed semi-transparent reflector, such as a partially silvered mirror 28 mounted at an angle of approximately 45° and a movable reflector, such as a solidly silvered mirror 29 also mounted at an angle of approximately 45°. The movable mirror 29 is coupled by means of a coupling lever 31 engaging a shoulder screw 32 on a bracket 30 movable with the lens carrier 12 so that the mirror 29 pivots in a predetermined relationship to the movement of the lens carrier toward and away from a light sensitive negative (not shown) placed in the camera.

Assuming the light conditions to be sufficient, the stationary mirror 28 being semi-pervious or semi-transparent to light permits the object to be photographed to be viewed through the mirror 28 and apertures or windows 33 and 34 located on the front and rear sides of the rangefinder casing 23' respectively. An image of the object to be photographed is also reflected from the movable mirror 29 to the back of the stationary mirror 28 and when the two images are superimposed upon one another, the lens is correctly positioned the proper distance from the camera. The second or reflected image enters the rangefinder through a lower aperture or window 36 located in the lower front side of the rangefinder casing 23'.

The light unit 24 attached to the upper end of the rangefinder casing 23' (as will be described more fully hereinafter) may be cylindrically shaped and has on the lower end thereof a flanged extension 37, Fig. 3 of smaller diameter than the diameter of the cylindrical casing 48. The extension 37 is tightly fitted in a corresponding opening 41 provided in the upper end of the rangefinder casing 23' for fastening the light unit to casing 23'. The light unit may be further secured to the rangefinder casing 23' by soldering or other suitable means. Under the opening 41 is a lens 44 suitably held in position by a ring such as 46. The lens 44 is positioned directly above and in alignment with the stationary semi-transparent mirror 28 and in addition to focusing a light beam on the mirror, the lens prevents dirt and dust from entering the rangefinder casing 23'.

The cylindrical casing 48 of the light unit 24 is adapted to receive and hold a short cylindrical member 49 preferably composed of Bakelite or other suitable insulating material. The member 49 fits loosely into the casing 48 and may be clamped in position therein by a clamping screw 51 threaded through a boss 52 on the casing. The lower end of the member 49 as shown in Fig. 3 is hollowed out and contained therein is a metal shell 53. The shell 53 has axial slots such as 54 therein so as to form fingers such as 56 on opposite sides of the shell. The shell 53 holds therein an electric light bulb 57 similar to the type employed in flashlights with the glass end of the bulb extending downward. The fingers 54 grasp the bulb 57 and hold the same in its inverted position.

The heretofore mentioned electrical cable 27 extending between the battery casing 26 and the light unit 24 contains two conductors. One of the conductors in the cable terminates on a screw 58, Figs. 3 and 4, while the other conductor terminates on a screw 59. The screw 59 extends into the member 49 and is threaded into the bottom of the shell 53. The screw 59 thus in addition to serving as a clamping or terminal member for one of the conductors of the cable 27 forms an electrical connection between this conductor and the shell 53. The terminal screw 58 has associated therewith a short wire 61 which extends down through a hole in the center of the member 49 to establish an electrical connection between the terminal screw 58 and the center terminal of the bulb 57. Thus the two conductors in the cable 27 are connected to the two terminals of the bulb 57, one to the tip and the other to the metal ring. A cap 62 is held to the member 49 by screws such as 63 and serves to cover the terminal screws 58 and 59 to prevent short-circuiting of the same and also to provide means for manually adjusting the bulb 57 within the cylindrical casing 48 by moving the lamp holder parallel to the axis of the casing 48 and by rotating the lamp within the casing, the first adjustment being necessary to place the lamp filament in the correct focal distance to lens 44 and the second one to attain filament images most favorable for accurate superimposition of the filament images. A Bakelite ring 64 is coiled about the inside of the cap to insulate the same from the terminal screws 58 and 59. By loosening the thumb screw 51 and grasping the cap 62 the bulb 57 may be adjusted relative to the casing 48 both in an axial and rotative direction.

The light from the bulb 57 when lit shines through a hole 66 in the bottom of the casing onto the lens 44, Fig. 1, and through the same to the rangefinder casing 23'. As will be best seen from Fig. 1 bulb 57 and mirrors 28, 29 are arranged in alignment, the upper side of the semi-transparent mirror being adjacent to the bulb. Hence, a light beam passing through lens 44 strikes mirror 28 first and a part of the beam is reflected from the upper side of the semi-transparent mirror 28 and out through aperture 33 into the direction in which the camera is aimed. The filtered part of the light beam passes through the semi-transparent mirror 28 and down onto the movable mirror 29 and then out through the aperture 26. In this connection it should be noted that each mirror covers the entire beam, and that the references made herein to the upper and lower side of the semi-transparent mirror refer to the sides of the reflecting surface of the mirror rather than to the sides of the glass body supporting the reflecting surface. The light beam through the upper aperture 33 is substantially parallel with the axis of the camera lens 13 and accordingly the camera will be aimed in the direction of this light beam.

In order to switch on and off the light bulb 57 a switch 27' such as a toggle switch is included in cable 27. As will be apparent from the previous description and can be best seen in Fig. 1, the filament of light bulb 57 and the centers of the two mirrors are placed in a direct line or in other words have a common axis. To be a more specific, the filament is placed opposite the upper side of the transparent mirror 28. Consequently the upper side of this transparent mirror can be used as the first reflector surface which reflects the light beam coming from the light bulb toward the object. The lower side of the semi-transparent mirror 28 serves as first reflector surface for rangefinding by comparison and relative adjustment of two images. The upper surface of the second or movable mirror 29 serves a dual purpose, to wit to reflect the part of the light beam filtered through the semi-transparent mirror toward the object to form the second light spot on the object, and also to project the second image of the object upon the lower side of the semi-transparent mirror. In other words by arrangement of the light unit in alignment with the two mirrors and opposite the upper side of the semi-transparent mirror a coaction between the light unit and the mirror system is attained permitting use of the rangefinder either by observation of two images on the stationary mirror or by observation of two light spots on the object without requiring a removal or relocating of the light unit.

The focusing of the camera lens is accomplished by adjustment of the angular position of mirror 29 whether the rangefinder is operated for night use with light unit or for day use without the light unit. As previously mentioned the pivoting of mirror 29 is controlled by the focusing movement of the lens carrier 12 toward or away from the camera casing, the pivoting of mirror 29 being controlled by and coupled with the lens carrier 12 by means including the coupling lever 31 in a manner more fully described in the above mentioned patent application Ser. No. 418,516, filed November 10, 1941. Since the control of the pivotal mirror is not part of the invention it is not described in detail herein. In this connection it should be noted that the invention is not limited to lens coupled rangefinders but it is also applicable to rangefinders with which the distance is measured directly and indicated on a dial. Rangefinders of this type are well known in the art.

Assuming now that the rangefinder is to be used under light conditions permitting an observation of two images of the object on the lower surface of mirror 28 the operator will then observe the two images through observation window 34. By moving the lens carrier 12 relative to the camera bed the two images can be brought into a superimposed position or in any other predetermined relative position such as a position edge to edge whereupon the lens is correctly focused for the distance of the object. It will be understood that for this use of the rangefinder the light bulb is switched off.

Assuming now that the light conditions are subdued, for instance during night time or for indoor work to preclude the observation of images of the object on mirror 28, all the operator has to do is to switch on light bulb 57 by means of switch 27'. Then as has been previously explained the light unit in coaction with the mirror system of the rangefinder will cause two light beams to emanate from the rangefinder which will produce two light spots on the object. The operator will again manipulate the lens carrier thereby varying the angular position of mirror 29 until the two light spots are brought into a predetermined relative position to each other. The adjustment is made preferably so that the two light beams emitted from the rangefinder coincide in the plane of the object for which the lens is to be focused, or in other words the two light spots will be superimposed when the lens is correctly focused. It will of course be understood that any other relative position of the two light spots can be selected.

If the operator will again change to operation of the rangefinder by observation of two images he simply switches off the light bulb.

The battery casing 26 may be fastened to the camera casing by any suitable means for example a bracket 69 having a pair of fingers such as 71 may be fixed to the camera casing. Fingers 71 are adapted to slide underneath raised portions of associated strips 72 secured to the top of the camera as shown in Fig. 1 for holding frictionally the battery casing of the camera. It should be noted that it is of course quite practical to place the battery in a compartment of the camera casing or to mount it separately from the camera.

Figs. 5 to 9 illustrate a modification of the rangefinder according to the invention in which the casing of the light unit is mounted at an angle of 90 degrees to the longitudinal axis of the rangefinder casing. The light unit includes a mirror which reflects the light beam of the light bulb toward the mirror system of the rangefinder. This reflecting mirror of the light unit is placed in alignment with the two mirrors of the rangefinder and opposite of the transparent mirror so that the same optical arrangement is present as in the first described embodiment of the invention although the light bulb itself does not share a common axis with the mirrors.

Referring now to Figs. 5 to 9, in detail, it will be seen that the mirror arrangement is the same as the one previously described while the light unit is modified. Furthermore the rangefinder is equipped with an eye tube subsequently described and the light unit is removably mounted on the rangefinder casing.

The modified light unit which hereinafter is referred to in general by reference numeral 80, will be first described. The casing 81 of the light unit is cylindrical and has the upper end thereof, as best shown in Fig. 8, cut off at an angle of approximately 45°. Attached to the sloping upper end of the casing 81 by means of screws 82 is a plate 83 which serves as a cover plate for the light unit. The lower end of the casing of the light unit is arranged to have inserted therein a bulb holding member 84 made of insulating material. The member 84 fits loosely inside the light unit casing and may be rotated therein and also moved axially relative to the light unit casing 81. A clamping screw 86, Figs. 7 and 9, threaded through the casing of the light unit, is provided for clamping the member 84 in an adjusted position. The upper end of the member 84 is recessed and located therein is a small bulb 87 of the type commonly used in flashlights. A short single wire spring 88 is attached to the member 84 by means of a screw 89 and at its upper end is in contact with the threaded sleeve portion 91 of the bulb 87. The spring 88 serves to hold the bulb in position in the bulb holding member 84 and also as one of the electrical connections. For this purpose screw 89 or spring 88 directly is connected by a wire 104 shown in dotted lines in Fig. 8 to a prong 105 of a plug (Fig. 9). The second prong 106 of the plug is electrically connected to a spring 101 which in turn engages the bottom terminal of bulb 87. Prongs 105 and 106 serve to receive a socket (not shown) connected to a cable such as cable 27 by means of which the light bulb is connected to a source of current. A toggle switch 27' is preferably included in the cable such as shown in Fig. 1. The circumference of member 84 may be somewhat flattened at section 107 to provide a better receiving surface for the socket.

The upper end of the casing 81 of the light unit 80 as shown in Fig. 8 has a hole therein, and fastened in register with the hole is a flanged member 108. The member 108 is held in place by soldering and is in the form of a sleeve. A hole extends through the member 108 and against an inside shoulder 111 therein is a small lens 112 held in place by a spring wire 113. The outer end of the member 108 as shown in Fig. 8 is of reduced diameter, and extending radially from the section of reduced diameter are three prongs or teeth 114 located approximately 120° apart around the circumference.

The rangefinder casing 23' (Fig. 6) is adapted to have the light unit of the modified form removably attached thereto. For this purpose an opening 123 is provided on the top of the rangefinder casing 23' slightly larger than the extending sleeve portion of the member 108, Fig. 8 of the modified light unit. The opening 123 has radial notches 124 therein which permit passage of the teeth or projections 114 on the sleeve portion of the light unit when it is inserted in the opening 123. The light unit 80 is attached to the rangefinder casing 23', Fig. 5 by inserting the sleeve portion of the member 108 in the opening 123 and when the sleeve of the member 108 is inserted a sufficient amount in the opening 123, the light unit may be rotated whereupon the teeth 114 engaging the inner side of the opening to lock the light unit to the rangefinder.

With the light unit 80 secured to the top of the rangefinder as shown in Fig. 5, light from the bulb 87 in the light unit is projected upon a mirror 127 (Fig. 8) mounted on the inside of the plate 83 for instance by means of a spring 127' through the lens 112 and into the rangefinder casing where the light divides and projects out through the windows 33 and 36 on the front side of the rangefinder. Adjustment of the camera lens operates the rangefinder in the manner hereinbefore set forth and changes the direction of one of the beams to assist in the proper focusing of the camera.

In order to facilitate the observation of the two images on stationary mirror 28 an eye tube may be provided. This eye tube is screwed into the inner thread of a flange 201 provided in alignment with observation window 34. The eye tube has for this purpose a threaded extension 203 fitting into the thread of flange 201. The length of the eye tube which is preferably widened at the outer end, corresponds substantially to the width of the camera casing so that the operator can place his eye conveniently against the wider part of the eye tube. It should be understood that an eye tube such as is shown in Fig. 5 may also be used for the rangefinder shown in Fig. 1.

The light unit shown in Figs. 5 to 9 has been illustrated and described as being removable. However, it can also be permanently fastened to the rangefinder casing as has been described for the light unit according to Figs. 1 to 4, and vice versa the light unit shown in the first embodiment can be removably fastened to the rangefinder casing instead of being permanently attached thereto.

In order to prevent the entrance of stray light or dust through the opening 123 of the casing 23' when the light unit is removed from the rangefinder casing a pivotal cover plate 67 pivoted on a screw 68 extending from the top of the rangefinder casing 23' is so fastened that it can be swung into position to cover the hole 123 in the casing when the light unit 80 is removed (see Fig. 6).

The operation of the rangefinder shown in

Figs. 5 to 9 whether by observation of the two images or of the two light spots is the same as has been described for the rangefinder shown in Figs. 1 to 4. As previously explained mirror 127 will reflect the light coming from bulb 87 through lens 112 whereupon the light beam will be divided by the upper reflecting surface of mirror 28 and the upper side of mirror 29 as has been previously explained. It will be observed that mirror 127 is in the same optical position as is the filament of the light bulb 57 of Fig. 1.

The position of the filament within casing 81 is adjusted for the correct focal distance between the filament and mirror 127 and lens 112 respectively. The adjustment of the lamp filament is accomplished by axial and rotative movement of lamp holder 84 which is then fixed in its correct position by means of said screw 86.

It is obvious, of course, that various modifications of the present invention may be made without departing from the spirit or essential attributes thereof, and it is desired therefore that only such limitations be placed thereon as are imposed by the prior art or are specifically set forth in the appended claims.

We claim:

1. Rangefinder adapted for use in conjunction with a camera comprising a fixed semi-transparent reflector and a pivotal reflector mounted in an optical relationship in which an image of an exterior object is viewable on the reflecting surface of the semi-transparent reflector facing the pivotal reflector and a second image of the object is projected by the pivotal reflector upon the said reflecting surface, a single light unit mounted in alignment with the two reflectors and facing the opposite or second reflecting surface of the semi-transparent reflector, said reflectors and said light unit being arranged in an optical relationship in which the light beam emitted by the light unit is partly reflected by the second or opposite reflecting surface of the semi-transparent reflector to project a light beam toward the object and partly penetrates the semi-transparent reflector and is reflected by the pivotal reflector to project a second light beam toward the object, and a means to adjust the angular position of the pivotal reflector for either controlling the relative position of the two images viewable on the first named reflecting surface of the semi-transparent reflector or the direction of the light beam projected by the pivotal reflector, said adjusting means being arranged either to place the said two images in a predetermined relative position to each other or to cause the two projected light beams to intersect when the angular relative position of the reflectors corresponds to the range of the object.

2. Rangefinder adapted for use in conjunction with a camera comprising a casing having two object windows in the front wall and an observation window in the rear wall, a fixed semi-transparent reflector mounted in the casing in register with the observation window and one of the object windows, and a pivotal reflector mounted in the casing opposite the other object window, said reflectors being mounted in an optical relationship in which an image of the exterior object is viewable on the reflecting surface of the semi-transparent reflector facing the pivotal reflector and a second image of the object is projected by the pivotal reflector upon the said reflecting surface, a single light unit mounted on the casing in register with an opening provided therein in alignment with the two reflectors and facing the opposite or second reflecting surface of the semi-transparent reflector, said reflectors and said light unit being arranged in an optical relationship in which a light beam emitted by the light unit is partly reflected by the second or opposite reflecting surface of the semi-transparent reflector to project a light beam toward the object and partly penetrates the semi-transparent reflector and is reflected by the pivotal reflector to project a second light beam toward the object, and a means to adjust the angular position of the pivotal reflector for either controlling the relative position of the two images viewable on the first named reflecting surface of the semi-transparent reflector or in the direction of the light beam projected by the pivotal reflector, said adjusting means being arranged either to place the said two images in a predetermined relative position to each other or to cause the two projected light beams to intersect when the angular relative position of the reflectors corresponds to the range of the object.

3. Rangefinder adapted for use in conjunction with a camera comprising a casing having two object windows in the front wall and an observation window in the rear wall, a fixed semi-transparent reflector mounted in the casing in register with the observation window and one of the object windows, and a pivotal reflector mounted in the casing opposite the other object window, said reflectors being mounted in an optical relationship in which an image of the exterior object is viewable on the reflecting surface of the semi-transparent reflector facing the pivotal reflector and a second image of the object is projected by the pivotal reflector upon the said reflecting surface, a single light unit comprising a housing, a lamp mounted for axial and rotative adjustment relative to the housing mounted therein and a focusing lens mounted in the housing in front of the lamp, supported on the casing in register with an opening provided therein in alignment with the two reflectors and facing the opposite or second reflecting surface of the semi-transparent reflector, said reflectors and said light unit being arranged in an optical relationship in which a light beam emitted by the light unit is partly reflected by the second or opposite reflecting surface of the semi-transparent reflector to project a light beam toward the object and partly penetrates the semi-transparent reflector and is reflected by the pivotal reflector to project a second light beam toward the object, and a means to adjust the angular position of the pivotal reflector for either controlling the relative position of the two images viewable on the first named reflecting surface of the semi-transparent reflector or the direction of the light beam projected by the pivotal reflector, said adjusting means being arranged either to place the said two images in a predetermined relative position to each other or to cause the two projected light beams to intersect when the angular relative position of the reflectors corresponds to the range of the object.

4. Rangefinder adapted for use in conjunction with a camera comprising a casing having two object windows in the front wall and an observation window in the rear wall, a fixed semi-transparent reflector mounted in the casing in register with the observation window and one of the object windows, and a pivotal reflector mounted in the casing opposite the other object window, said reflectors being arranged in an optical relationship in which an image of the exterior object is viewable on the reflecting surface of the semi-transparent reflector facing the pivotal reflector and a second image of the object is projected by the pivotal reflector upon the second reflecting surface, a light unit comprising an elongated housing mounted on the casing in a position in which the longitudinal axis of the housing is at an angle with the longitudinal axis of the casing, an electric lamp mounted in the housing and a reflector disposed in the housing in register with an opening in the casing, said light unit-reflector being mounted on a common axis with the two first named reflectors and facing the opposite or second reflecting surface of the semi-transparent reflector, said reflectors being arranged in an optical relationship in which a light beam emitted by the light unit and reflected by the light unit-reflector into the casing is partly reflected by the second or opposite reflecting surface of the semi-transparent reflector to project a light beam toward the object and partly penetrates the semi-transparent reflector and is reflected by the pivotal reflector to project a second light beam toward the object, and a means to adjust the angular position of the pivotal reflector for either controlling the relative position of the two images viewable on the first named reflecting surface of the semi-transparent reflector or the direction of the light beam projected by the pivotal reflector, said adjusting means being arranged either to place the said two images in a predetermined relative position to each other or to cause the two projected light beams to intersect when the angular relative position of the reflectors corresponds to the range of the object.

5. Rangefinder as described in claim 3 in which the light unit housing is removably mounted on the casing.

6. In combination with a rangefinder of the type described, a light unit for projecting a light beam into said rangefinder, a sleeve member on said light unit having radially extending projections, said rangefinder having an opening with radial notches therein adapted to receive said sleeve member to permit passage of said projections therethrough and to lock said light unit in position on the rangefinder after the insertion of said sleeve member in said opening and the rotation of said sleeve relative to said opening on the axis thereof.

7. In combination with a rangefinder of the type described, a light unit for projecting a light beam into said rangefinder, a sleeve member on said light unit having radially extending projections, said rangefinder having an opening with radial notches therein adapted to receive said sleeve member to permit passage of said projections therethrough, said projections to engage the under side of said opening after the insertion of said sleeve member in said opening at least a predetermined distance and to lock said light unit to the rangefinder after rotation of the light unit about the axis of said opening, said light unit about the axis of said opening, said light unit also including an electric bulb, and means for adjustably positioning said bulb in said light unit.

8. In combination with a rangefinder of the type described for assisting in the focusing of a camera associated with said rangefinder, a light unit, a sleeve on said light unit, said sleeve having radially extending projections, said rangefinder having an opening therein with radially extending notches adapted to receive said sleeve for permitting the insertion of said sleeve in said opening only with said sleeve in predetermined positions relative thereto, said projections to lock said light unit in place relative to said rangefinder, after the insertion of said sleeve in said opening and rotating the same relative to said opening whereby said projections engage the underside of said opening.

9. A rangefinder for assisting in the focusing of a camera including a focusing lens movable relatively to a light sensitive negative in the casing, comprising a fixed semi-transparent mirror and a movable mirror arranged to be operatively controlled by the focusing movement of the lens, a casing having a viewing window and a pair of object windows for mounting the mirrors therein, means including a first image viewable on the semi-transparent mirror and a second image reflected from the movable mirror and one side of the semi-transparent mirror for determining the focusing position of the camera lens by the relative position of the two images, a light unit including a source of light, means for attaching the light unit to the rangefinder casing in register with an opening provided therein to project a light beam into the rangefinder casing independently of the viewing window and without interfering with the visual use thereof, said light beam being directed to the side of the semi-transparent mirror opposite to the one employed in the image-viewing use of the rangefinder, part of the beam passing through the semi-transparent mirror to the movable mirror and thence out through one of the object windows and part of the light beam being reflected by the said opposite side of the semi-transparent mirror through the other of the object windows, and means mechanically coupled with and controlled by the movement of the camera lens to control the angular position of the movable mirror corresponding to the lens movement for placing either the two images in a predetermined relative position to each other or to cause the two light beams to intersect in the plane of the object when the angular position of the movable mirror corresponds to the range of the object.

10. Rangefinder for use in conjunction with a camera having a lens mounted in the camera casing movable relative to a light sensitive negative in the camera casing, comprising a casing having two object windows in the front wall and an observation window in the rear wall, a fixed semi-transparent reflector mounted in the casing in register with the observation window and one of the object windows and a pivotal reflector mounted in the casing opposite to the other object window, said reflectors being arranged in an optical relationship in which an image of an exterior object is viewable on the reflecting surface of the semi-transparent reflector facing the pivotal reflector and a second image of the object is projected by the pivotal reflector upon the said reflecting surface, a light beam projecting element mounted on the rangefinder casing in register with an opening provided therein in a direct line with the centers of the two reflectors and facing the opposite or second reflecting surface of the semi-transparent reflector, said reflectors and said light beam projecting element being arranged in an optical relationship in which the light beam of the light beam projecting element is partly reflected by the second or opposite reflecting surface of the semi-transparent reflector to project a light beam toward the object and partly penetrates the semi-transparent reflector and is reflected by the pivotal reflector to project a second light beam toward the object, and a means mechanically coupled with and controlled by the movement of the camera lens to adjust the angular position of the pivotal reflector corresponding to the lens movement for either controlling the relative position of the two images viewable on the first mentioned reflecting surface of the semi-transparent reflector or the direction of the light beam projected by the pivotal reflector, said adjusting means being arranged either to place the said two images in a superimposed position or to cause the two light beams projected toward the object to intersect when the angular relative position of the reflectors corresponds to the range of the object and the lens is correctly focused.

11. Rangefinder adapted for use in conjunction with a camera comprising a casing having two object windows in the front wall and an observation window in the rear wall, a fixed semi-transparent reflector mounted in the casing in register with the observation window and one of the object windows, and a pivotal reflector mounted in the casing opposite the other object window, said reflectors being mounted in an optical relationship in which an image of the exterior object is viewable in the reflecting surface of the semi-transparent reflector facing the pivotal reflector and a second image of the object is projected by the pivotal reflector upon the said reflecting surface, a single light unit comprising a housing, an electric lamp mounted therein for axial and rotative adjustment relative to the housing and a focusing lens mounted in the housing in front of the lamp, the light unit being removably mounted on the casing in register with an opening provided therein in alignment with the two reflectors and facing the opposite or second reflecting surface of the semi-transparent reflector, said reflectors and said light unit being arranged in an optical relationship in which a light beam emitted by the light unit is partly reflected by the second or opposite reflecting surface of the semi-transparent reflector to project a light beam toward the object and is partly filtered through the semi-transparent reflector and reflected by the pivotal reflector to project a second light beam toward the object, a means to adjust the angular position of the pivotal reflector for either controlling the relative position of the two images viewable on the first named reflecting surface of the semi-transparent reflector or the direction of the light beam projected by the pivotal reflector, said adjusting means being arranged either to place the said two images in a predetermined relative position to each other or to cause the two projected light beams to intersect in the plane of the object when the angular relative position of the reflectors corresponds to the range of the object, and a light switch to connect the electric lamp to a source of current thereby permitting rangefinding either by image comparison or by light beam angle comparison by operation of the light switch without relocating the light unit.

12. Rangefinder as described in claim 10 in which the fixed reflector is mounted in an angular position in which a light beam reflected therefrom is substantially parallel to the axis through the center of the camera lens for aiming the camera on the object.

HYMAN SCHWARTZ.
WILLIAM CASTEDELLO.